(12) United States Patent
Ahiska et al.

(10) Patent No.: US 8,139,896 B1
(45) Date of Patent: Mar. 20, 2012

(54) TRACKING MOVING OBJECTS ACCURATELY ON A WIDE-ANGLE VIDEO

(75) Inventors: Yavuz Ahiska, Esher (GB); Andrea Elvis Castellari, Horley (GB); Mark Kenneth Davey, Bromley (GB)

(73) Assignee: Grandeye, Ltd. (GB)

( * ) Notice: Subject to any disclaimer, the term of this patent is extended or adjusted under 35 U.S.C. 154(b) by 299 days.

(21) Appl. No.: 11/390,957

(22) Filed: Mar. 28, 2006

Related U.S. Application Data

(60) Provisional application No. 60/665,767, filed on Mar. 28, 2005.

(51) Int. Cl.
*G06K 9/00* (2006.01)
*G06K 9/36* (2006.01)
*G06K 9/40* (2006.01)
*H04N 7/18* (2006.01)

(52) U.S. Cl. ........ 382/298; 382/103; 382/275; 382/276; 348/143; 348/147; 348/152; 348/159

(58) Field of Classification Search .................. 382/103, 382/190, 195, 203–204, 224–225, 275, 286, 382/217; 348/143, 147, 152–154, 159
See application file for complete search history.

(56) References Cited

U.S. PATENT DOCUMENTS

| | | | | |
|---|---|---|---|---|
| 5,625,715 | A * | 4/1997 | Trew et al. | 382/236 |
| 5,666,157 | A * | 9/1997 | Aviv | 348/152 |
| 5,926,231 | A | 7/1999 | Jung | |
| 5,991,428 | A | 11/1999 | Taniguchi | |
| 6,025,879 | A | 2/2000 | Yoneyama et al. | |
| 6,141,435 | A | 10/2000 | Naoi et al. | |
| 6,844,990 | B2 | 1/2005 | Artonne et al. | |
| 6,865,028 | B2 | 3/2005 | Moustier et al. | |
| 7,251,373 | B2 * | 7/2007 | Kortum et al. | 382/239 |
| 7,281,543 | B2 | 10/2007 | Calkins et al. | |
| 7,529,424 | B2 | 5/2009 | Ahiska | |
| 7,688,349 | B2 | 3/2010 | Flickner et al. | |
| 7,893,985 | B1 | 2/2011 | Ahiska et al. | |
| 7,894,531 | B1 | 2/2011 | Cetin et al. | |
| 7,990,422 | B2 | 8/2011 | Ahiska et al. | |
| 2002/0012449 | A1 * | 1/2002 | Bradski | 382/103 |
| 2002/0054211 | A1 * | 5/2002 | Edelson et al. | 348/169 |
| 2004/0131254 | A1 * | 7/2004 | Liang et al. | 382/181 |
| 2005/0078178 | A1 * | 4/2005 | Brown et al. | 348/139 |
| 2005/0180656 | A1 * | 8/2005 | Liu et al. | 382/284 |
| 2006/0017807 | A1 * | 1/2006 | Lee et al. | 348/36 |
| 2006/0062478 | A1 | 3/2006 | Cetin et al. | |

(Continued)

OTHER PUBLICATIONS

Comaniciu et. al., "Adaptive Resolution System for Distributed Surveillance", 2002 Elsevier Science Ltd, Real-Time Imaging vol. 8 Iss. 5, Oct. 2002, pp. 427-437.*

(Continued)

*Primary Examiner* — Anand Bhatnagar
*Assistant Examiner* — Nathan Bloom
(74) *Attorney, Agent, or Firm* — Robert O. Groover; Seth A. Horwitz

(57) ABSTRACT

A method and a system for tracking the motion of moving objects accurately on the entirety of a wide-angle video is disclosed. The method includes using a non-uniform scaling to selectively enhance pixel density, preferably in preparation for other image processing. In preferred embodiments, the further image processing (such as motion detection, object recognition, or tracking, etc.) functions better with the enhanced pixel density or distribution.

13 Claims, 6 Drawing Sheets

U.S. PATENT DOCUMENTS

2006/0243326 A1   11/2006   Calkins et al.
2007/0127775 A1*   6/2007   Moon et al. .................. 382/103

OTHER PUBLICATIONS

Bernardino et. al., "Foveated Active Tracking With Redundant 2D Motion Parameters", 2002 Elsevier Science Ltd, Robotics and Autonomous Systems 29 (2002) pp. 205-221.*

Daniilidis et. al., "Real-Time Tracking of Moving Objects with an Active Camera", 1998 Academic Press Ltd, Real Time Imaging 4(1), Feb. 1998.*

Bolduc et. al., "Fast Computation of Multiscalar Symmetry in Foveated Images", Computer Architectures for Machine Perception, 1995. Proceedings. CAMP '95, IEEE publication 1995.*

Tan et. al., "Performance of Three Recursive Algorithms for Fast Space-Variant Gaussian Filtering", 2003 Elsevier Ltd, Real Time Imagin 9(2003) pp. 215-228.*

Comaniciu and Meer, "Mean Shift: A Robust Approach Toward Feature Space Analysis", IEEE Transactions on Pattern Analysis and Machine Intelligence, vol. 24, No. 5, May 2002.*

Kannala et. al., "A Generic Camera Calibration Method for Fish-Eye Lenses", Proceedings of the 17$^{th}$ International Conference on Pattern Recognition, Aug. 2004, IEEE.*

Devernay et al., "Straight Lines Have to be Straight", Machine Vision and Applications (2001) 13: 14-24, Springer-Verlag.*

Boult et al., "Omin-Directional Visual Surveillance", Image and Vision Computing 22 (2004) 515-534, Elsevier Computer Science.*

Frank Wallhoff, Martin Zobl, Gerhard Rigoll, and Igor Potucek. 2004. Face Tracking in Meeting Room Scenarios Using Omnidirectional Views. In Proceedings of the Pattern Recognition, 17th International Conference on (ICPR'04) vol. 4—vol. 04 (ICRP '04), vol. 4. IEEE Computer Society, Washington, DC, USA, 933-936.*

* cited by examiner

Non-distorted 802
Distorted 804
Distorted 806

TRACKING MOVING OBJECTS ACCURATELY ON A WIDE-ANGLE VIDEO

CROSS-REFERENCE TO RELATED APPLICATIONS

This application claims priority from U.S. provisional patent application 60/665,767 filed on Mar. 28, 2005, which is hereby incorporated by reference.

BACKGROUND AND SUMMARY OF THE INVENTION

Field of the Invention

The present invention relates to accurately tracking the motion of moving objects on digital video. More specifically, the present innovations relate to tracking moving objects on the entirety of a wide-angle high-resolution digital video, wherein object coordinates may then be transformed into different world coordinates.

Wide-Angle Cameras

Wide-angle cameras are known in the prior art, and many are consistent with implementing preferred embodiments of the present innovations. Some useful examples of such technology follow.

U.S. patent application 60/467,467 filed on May 2, 2004, by Yavuz Ahiska and hereby incorporated by reference, describes multiple object processing in a wide angle video camera.

U.S. provisional patent application No. 60/553,186, and its non-provisional related application (which has not been assigned a filing number at this time, but which was filed on Mar. 15, 2005), both of which are hereby incorporated by reference, involve a wide-angle electronic camera with improved peripheral vision and describes a camera where the wide field of view is optically modified via the special lens to provide a wide-angle video. This camera is indeed suitable for object tracking in a wide area.

U.S. patent application No. 60/467,705 filed Apr. 30, 2004, and titled "Correction of Optical Distortion by Image Processing" and hereby incorporated by reference, describes a methodology which provides two dimension to two dimension image morphing particularly suitable for image transformation processing wide-angle video.

U.S. patent application 60/589,104, filed Jul. 17, 2004, titled "Automatically Expanding The Zoom Capability Of A Wide-Angle Video Camera" and hereby incorporated by reference, achieves its ends by attaching a mechanical dome camera with high optical magnification capability as a slave. In this invention image analysis of the wide-angle video is performed within the camera to derive world object coordinates compatible with the said slave dome camera. These coordinates are then fed into the slave camera in form of pan tilt zoom commands to obtain a magnified image of the object of interest. In such a configuration the coordinate system of the slave camera must be calibrated with respects to the wide-angle camera via techniques discussed in GRND-04.

U.S. patent application Ser. No. 10/924,279, filed Aug. 23, 2004, and hereby incorporated by reference, is titled "Tracking Moving Objects in Video Using Wavelet Domain Information," and covers a method and system for tracking moving objects in video.

U.S. patent application 60/601,813, filed Aug. 16, 2004, and U.S. patent application 60/652,879 filed Feb. 15, 2005 both address region sensitive compression of video data, and are hereby incorporated by reference.

Image analysis for tracking of a moving object may be carried out variety of well-known algorithms including by mean-shift analysis.

In U.S. Pat. No. 5,926,231, hereby incorporated by reference, Jung describes a method where motion vectors of small image blocks are determined between the current frame and the preceding frame using the actual image data. The system described in this patent computes the motion of small blocks not moving objects.

In addition, Jung neither tries to use the histogram of moving pixels nor their wavelet transform coefficients.

In U.S. Pat. No. 6,141,435, hereby incorporated by reference, Naoi, et al., describes a method that classifies moving objects according to their motion. In this system several background images are estimated from the video and speeds of moving objects are determined by taking the difference of the current image and estimated background images. Naoi, et al. neither tries to use the histogram of moving pixels nor their wavelet transform coefficients.

In U.S. Pat. No. 6,025,879, hereby incorporated by reference, Yoneyama et. al, describes a system for detecting a moving object in a moving picture, which can detect moving objects in block based compression schemes without completely decoding the compressed moving picture data. Yoneyama et al.'s method works only in block based coding schemes, which divide images into small blocks and compress the image and video block by block. The method is based on the so-called motion vectors characterizing the motions of blocks forming each image.

In U.S. Pat. No. 5,991,428 hereby incorporated by reference, Taniguchi et. al, describe a moving object detection apparatus including a movable input section to input a plurality of images in a time series, in which a background area and a moving object are included. This method is also based on comparing the actual pixel values of images forming the video and there is neither an attempt to represent objects using wavelet transform coefficients nor use compressed images nor compressed video stream for background estimation.

US Patent application with number 0107649 dated Jun. 12, 2003 by Flickner and Haritaoglu, hereby incorporated by reference, describes a method off detecting and tracking groups of people. In this patent application people in a video scene are characterized and tracked based on their histograms obtained from image pixel values.

Tracking Moving Objects Accurately on a Wide-Angle Video

A method and a system for tracking the motion of moving objects in a wide-angle video sequence is disclosed. A typical image analysis object tracking when performed on a sequence of wide-angle video frames produces inaccuracies as the objects move towards the edges of the field of view.

With the arrival of high-resolution wide-angle cameras it is now possible to perform object tracking more accurately. However image analysis tracking is very computationally intensive therefore often performed on a reduced image copy of the captured wide-angle image.

It is possible to apply a non-linear transformation while reducing the image size so that the resultant image has a pixel distribution better suited to perform object tracking on the entire image. Such a transformation may be performed using image-morphing techniques.

This method is particularly suitable for use within high resolution cameras used in CCTV surveillance.

Once the object is tracked in the wide-angle camera its coordinates could be transformed to the world coordinates of external devices for control or monitoring purposes. These coordinates may be converted into a series of pan tilt zoom commands to a mechanical dome camera nearby whose coordinates are calibrated and stored in the wide-angle camera.

Though preferred implementations include object tracking, the innovations disclosed herein can also be applied in other image processing contexts.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

Most embodiments in this application are described in the preferred context of a wide-angle camera or video camera. The referenced wide-angle camera could be based on the wide-angle camera described in 2839PR "Multiple object processing in wide angle video camera." Other known types of camera could also be implemented consistent with a preferred embodiment of the present innovations.

Image Transformation
Analysis of High Resolution Imagery

Image analysis of high-resolution imagery is often impractical because of the number of pixels involved and the limited power of the processor. To overcome this the high resolution image is often scaled to a size that makes the analysis practical. Normally the translation from high-resolution to lower resolution is done using a spatially linear scaling function that preserves the aspect ratio of the original.

Using a spatially linear scaling of the image means that resulting loss of resolution is equal in all parts of the image, i.e., the spatial sampling rate is uniform across the image. The result may be that in some parts of the image, there is insufficient data for an analysis function to be successful although there was sufficient data in the original image. Conversely, in other parts of the image, there may be more data than is strictly necessary for the analysis function to be successful.

For example, if the image contains objects and in some parts of the image those objects are smaller (perhaps due to being further away from the camera), those more distant objects will be made up of fewer pixels than closer objects. Analysis functions which depend on the number of pixels in an object may fail on the smaller objects in the scaled image because there are not enough pixels, although there might have been enough pixels for the analysis function to succeed in the high resolution image.

Figure 1:
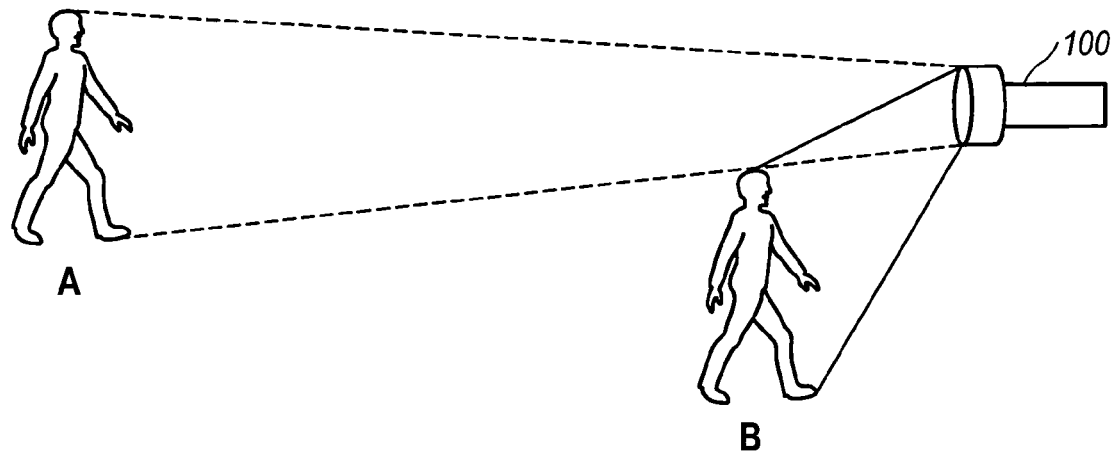
FIG. 1 is a schematic of a system, in which a programmable high-resolution wide-angle camera (which is wall-mounted) captures the video of a scene consistent with a preferred embodiment.

FIG. 1 provides an example view of a camera 101 (for example, mounted on a wall) view of two objects, person A and person B. A is farther from the camera than B, and because of this, A will appear smaller than B in an image of the camera's view.

Figure 2:
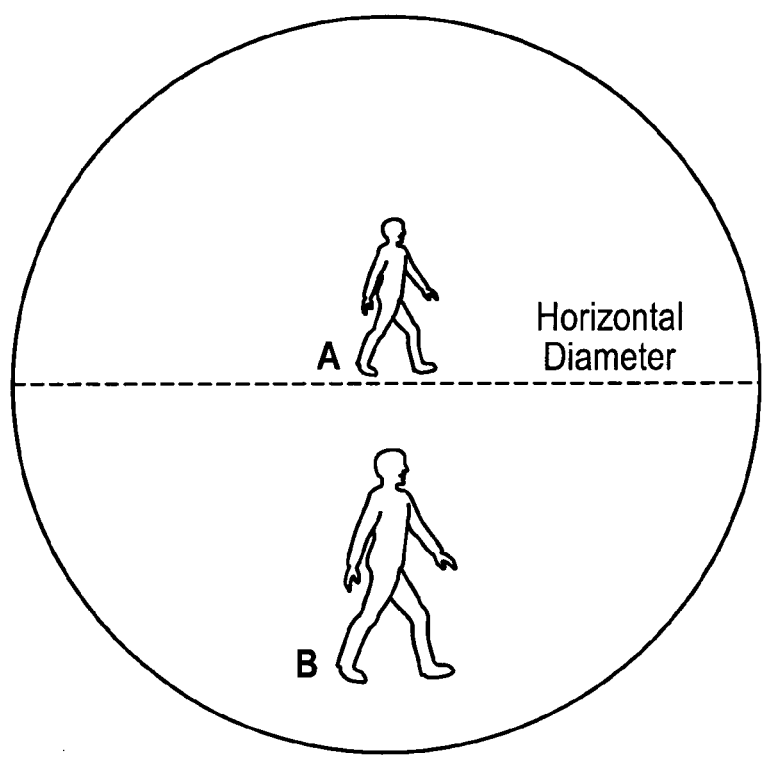
FIG. 2 is a schematic representation of the wide-angle image from the wall-mounted camera of FIG. 1 before transformation consistent with a preferred embodiment.

FIG. 2 shows an example of the relative sizes of A and B (From FIG. 1) as seen from camera 101. Because A is smaller than B, A will typically occupy or be made up of fewer pixels than B.

In preferred embodiments, an image analysis function is applied to the image (or, in preferred embodiments, multiple frames or images from a video). In one preferred embodiment, the image analysis function is object tracking, but can be other analysis functions, such as motion detection, object recognition, or other analysis functions. Often, scaling is applied to an image or images, for example to reduce the total number of pixels that must be used by an image analysis function. Examples of this context are used to describe a preferred embodiment, below.

Example of Application of Principle

1. Let the image be a view from an elevated camera 100 looking horizontally across a boulevard on which people (A and B, from FIGS. 1 and 2) are walking. A person on the far side of the boulevard (e.g., person A) appears smaller (and has fewer pixels) than those nearer side (such as person B).
2. Let the image analysis function be an algorithm to identify and count people in an image and let the image analysis function require a number of pixels Q to identify a person.
3. Let a person on the far side of the boulevard (person A) occupy 2Q pixels in the high-resolution image and a person on the near side (person B) occupy 12Q pixels.

If the low-resolution image is half the height and half the width of the high-resolution image and spatially linear scaling is used, the number of pixels in any area of the low-resolution image is, for example, ¼ of the number in the same area of the high-resolution image. Hence people on the far side have Q/2 pixels and cannot be identified but people on the near side will have 3Q pixels and can be identified, because the image analysis function requires Q pixels to function properly (in this example).

Hence, in this example, because of the need to reduce total pixel count and the application of a spatially linear scaling to the image, part of the image can no longer be usefully analyzed by the image analysis function.

In preferred embodiments of the present innovations, a spatially non-linear scaling is applied to the image. This allows some parts of the image to be scaled more or less than others, to thereby selectively preserve pixel count in. For example, where small objects are to be analyzed, it is preferable to preserve pixel count, while where large objects are to be analyzed, preservation of pixel count is less necessary (and such large objects can be scaled more while retaining the usefulness and accuracy of the image analysis function).

Figure 3:
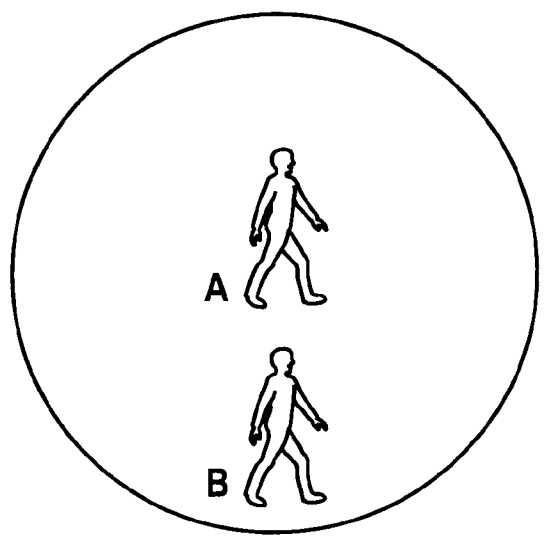
FIG. 3 is a schematic representation of the wide-angle image from the wall-mounted camera of FIG. 1 after non-linear transformation consistent with a preferred embodiment.

FIG. 3 shows one example, following the context of FIGS. 1 and 2, where a non-uniform or non-linear scaling is applied. The image is scaled down for image processing preferably using a spatially non-linear function. In this example, the non-linear function scales less along the horizontal diameter (preserving more pixels in person A) and scales more at the top and bottom of the image reducing the number of pixels in person B by a greater amount). Hence, in this example, person A is scaled less than person B, resulting in a closer similarity of size between the two objects after scaling. Because they are of more similar size after scaling, each person A and B would occupy more similar number of pixels, allowing more accurate or equal image analysis to be performed.

Hence, if a spatially non-uniform mapping is used which reduces the size of objects on the far side of the boulevard by only ½ and on the near side by 1/12, then both near and far people occupy Q pixels in the low-resolution image so analysis can identify people throughout the whole image.

Image transformation to derive an enhanced lower resolution frame can be based, in one example embodiment, on the algorithm provided by 2823PR (referenced above) titled, "Correction of Optical Distortion by Image Processing". Other algorithms and methods for image transformation can also be used, within the scope of the present innovations.

This algorithm could be implemented on the image-processing unit of the programmable camera as described above, or be implemented separately, such as part of a computer system in communication with a camera system.

The innovations described above are preferably implemented in the context of a wide-angle video camera. In preferred embodiments, a wide-angle video camera distorts the view it captures from a Cartesian world-view to one that is non-Cartesian. Hence, some areas will appear larger than in reality, while other areas may appear smaller than in reality. Objects in areas that are large will occupy more pixels, while objects in areas that are small have less pixels. In preferred embodiments of the present innovations, areas that are reduced in size or pixels (for example, in some wide-angle cameras, the edges are compressed and therefore include smaller numbers of pixels per object) are scaled so that their number of pixels is preserved with respect to the scaling of other areas.

The area of the image that is least scaled depends on the position and view of the camera. Wall-mounted cameras in elevated positions might need to preserve resolution in the center of the image; ceiling mounted cameras will have larger objects directly beneath them so will preserve resolution on the periphery of the image.

Figure 4:
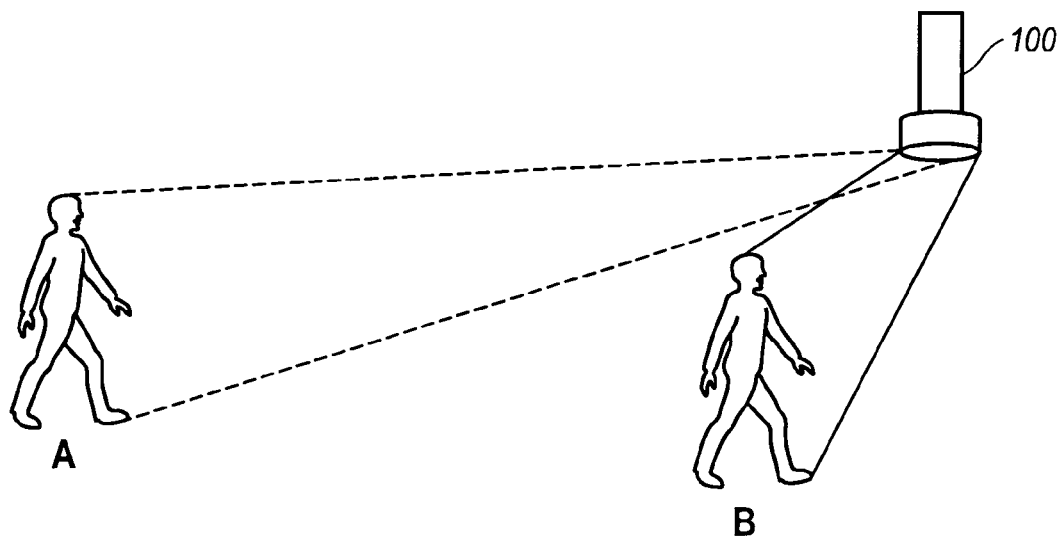
FIG. 4 is a schematic of a system in which a programmable high-resolution wide-angle camera (which is ceiling-mounted) captures video of a scene consistent with a preferred embodiment.
Figure 5:
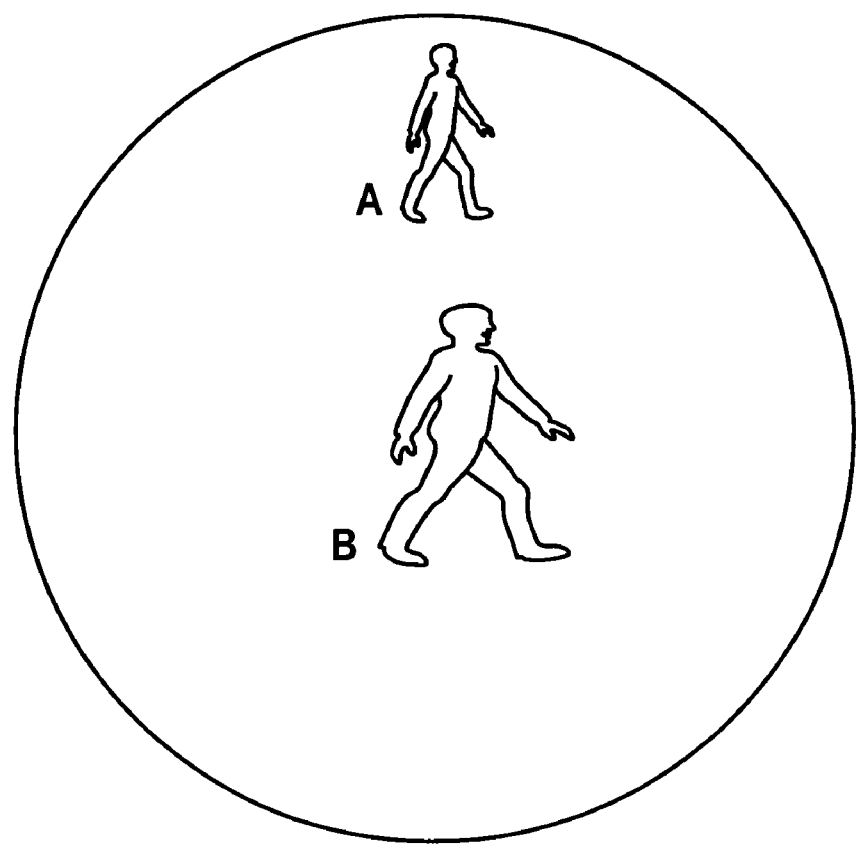
FIG. 5 is a schematic representation of the wide-angle image from the ceiling-mounted camera of FIG. 3 image before transformation consistent with a preferred embodiment.

FIG. 4 shows an implementation with a ceiling mounted camera, such as a wide-angle video camera (useful in the context of security, for example). In this example, the scene again includes two objects, person A and person B. Person A is farther away than person B, and, as shown in FIG. 5, person A appears on the periphery of the image while person B appears closer to the center. Both because of their distance and because of distortions introduced into the wide-angle lens system (it is noted that several types of distortion can be introduced, depending on what kind of wide-angle lens system is used), person A appears smaller than person B and occupies fewer pixels in the un-scaled image. Also, person B appears foreshortened because of the distortion and/or viewing angle.

Figure 6:
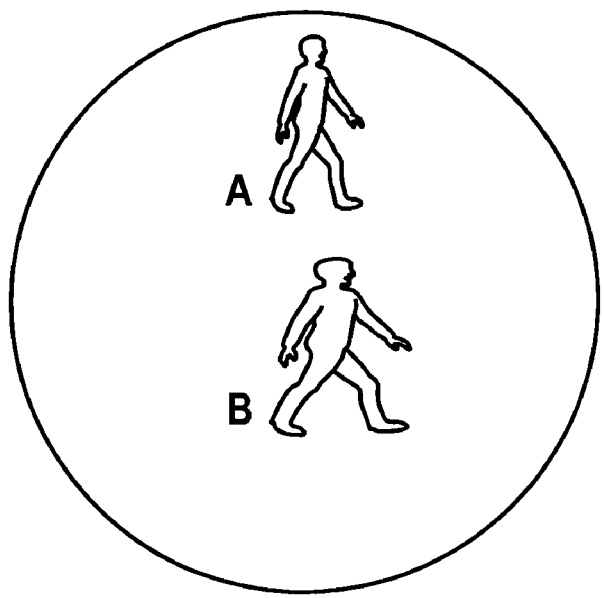
FIG. 6 is a schematic representation of the wide-angle image from the ceiling-mounted camera of FIG. 3 after transformation consistent with a preferred embodiment.

FIG. 6 shows the image after applying a non-uniform scaling, such as using a spatially non-linear function, that scales less on the periphery (where radius is larger) and more near the center of the image. The result is an image where person A and person B are more similar in size.

Figure 7:
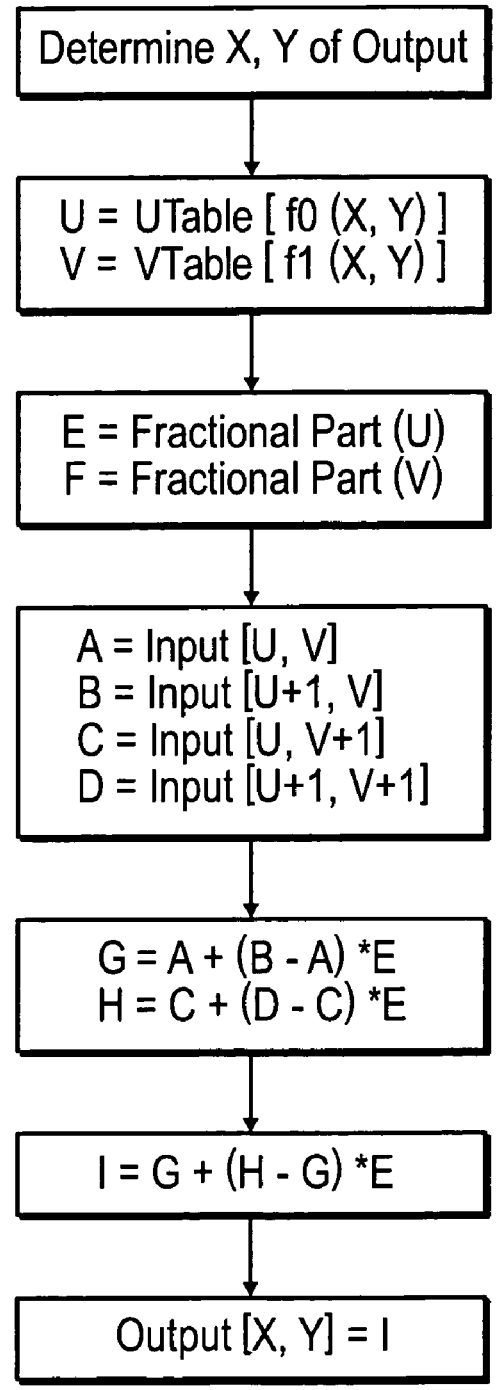
FIG. 7 is a block diagram illustrating a method for producing an output image that is downsampled from an input image using a non-linear transformation function consistent with a preferred embodiment.

FIG. 7 is a block diagram illustrating one example method for producing an output image that is downsampled from an input image using a non-linear transformation function.

The two functions $f_0(X,Y)$ and $f_1(X,Y)$ implement the scaling of the output pixel co-ordinates to the co-ordinate system of the original input picture.

The tables UTable and VTable implement the non-linear remapping of the coordinates of the original picture to their new co-ordinates in the original picture.

In general, these co-ordinates will not be exact integer values so bilinear interpolation is used to generate a new input pixel value.

This process uses techniques described in 2823PR "Correction of Optical Distortion by Image Processing."

Figure 8:
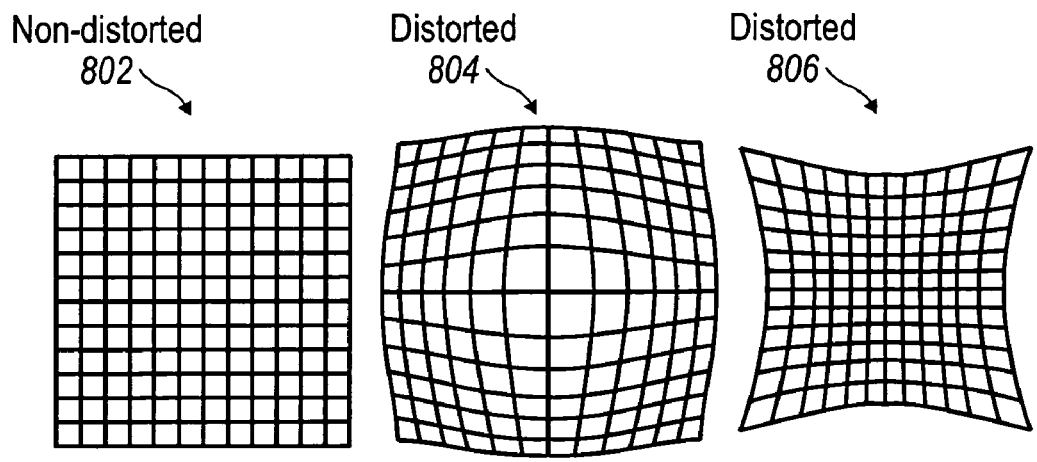
FIG. 8 shows a series of distortions that can potentially be introduced into images.

FIG. 8 shows some examples of different spatial maps of an image. Non-distorted space 802 retains true pixel values and sizes of objects, while distorted spaces 804, 806, do not. Objects on the periphery (or center, depending on the specifics of the distortion) of distorted spaces 804, 806, can have reduced pixel values and/or sizes with respect to other areas in the images. For example, distortion 804 is similar to the distortion introduced in some wide-angle lens systems, which expand spatial regions in the center while compressing regions on the periphery. Therefore, objects near the center of a field of view of a wide-angle camera will comprise more pixels than objects at the edge of the field of view of the wide-angle camera. The present innovations, in this context, preferably applies a spatially non-linear scaling process such that regions of fewer pixels per object of interest (such as the periphery) are scaled down less than regions with more pixels per object of interest.

Figure 9:
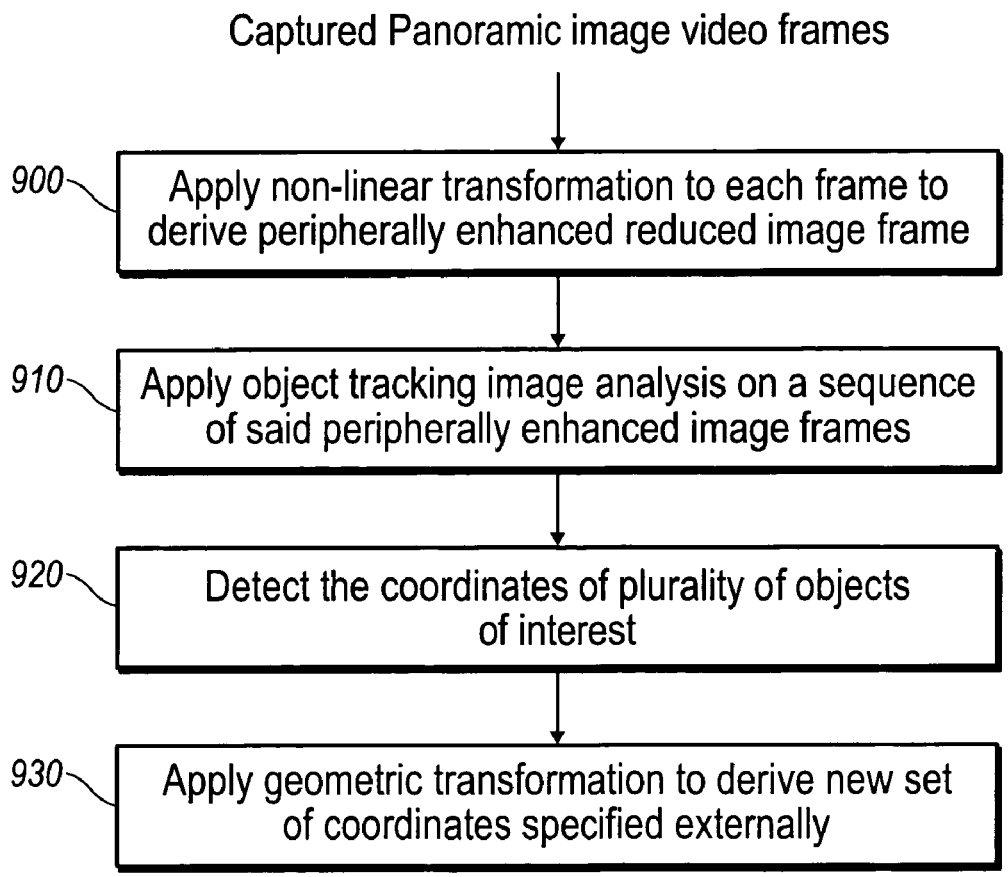
FIG. 9 shows a flowchart with process steps consistent with implementing an embodiment of the present innovations.

FIG. 9 shows a flowchart with process steps for implementing one embodiment of the present innovations. In this example, captured wide-angle video frames are captured, and a non-linear transformation is applied to each frame to derive enhanced reduced image frames (step 900). Object tracking image analysis is then applied on a sequence of the enhanced image frames (step 910). The coordinates of a plurality of objects of interest are detected (step 920), and a geometric transformation is applied to derive a new set of externally specified coordinates (step 930).

Figure 10:
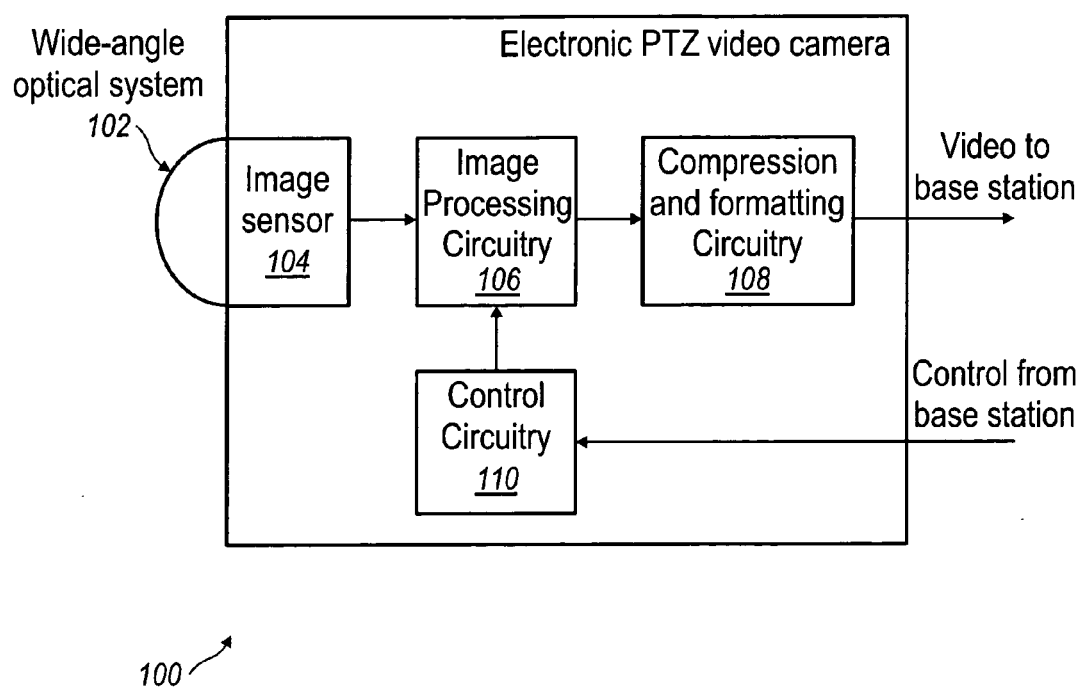
FIG. 10 shows an example camera system consistent with preferred embodiments of the present innovations.

FIG. 10 shows an example camera system consistent with implementing a preferred embodiment of the present innovations. Camera 100 includes an optical system 102 that communicates with image sensor 104. In preferred embodiments, optical system 102 is a wide-angle lens system, possibly including holographic elements, multiple lenses, or other elements. Sensor 104 passes a captured image to image processing circuitry 106 for processing, such as distortion correction, scaling, object tracking, or other image processing.

Processed images are preferably compressed by compression and formatting circuitry 108 before being output, such as to a base station (not shown) for monitoring. Camera 100 can be, for example, controlled remotely, such as from base station, using signals to control circuitry 110. It is noted that these elements and their arrangement are only illustrative, and not intended to limit the context or implementation of the present innovations.

These innovations can have use in contexts where image processing is concerned, particularly where an image processing technique depends for accuracy or use on the number of pixels in particular regions. One preferred context is in object tracking.

Detailed Description of Object Tracking

In a preferred embodiment using object tracking, many different methods of object tracking can be used. In one example implementation, the system first segments each image frame of the video into foreground and background regions using the red, green, and blue (RGB) color channels of the video or using the YUV (luminance and chrominance) channels. Foreground-background separation can be achieved in many ways, as described in the various references cited and incorporated herein. The background of the scene is defined as the union of all stationary objects and the foreground consists of transitory objects. A simple approach for estimating the background image is to average all the past image frames of the video (e.g., the article "*A System for Video Surveillance and Monitoring*," in *Proc. American Nuclear Society (ANS) Eighth International Topical Meeting on Robotics and Remote Systems*, Pittsburgh, Pa., Apr. 25-29, 1999 by Collins, Lipton and Kanade), which is hereby incorporated by reference. A statistical background estimation method is described in the article by C. Stauffer et al., "Adaptive background mixture models for real-time tracking," IEEE Computer Vision and Pattern Recognition Conference, Fort Collins, Colo., June 1999, which is hereby incorporated by reference. Pixels of the foreground objects are estimated by subtracting the current image from the estimated background image. Moving blobs are constructed from the pixels by performing a connected component analysis, which is a well-known image processing technique (see e.g., *Fundamentals of Digital Image Processing* by Anil Jain, Prentice-Hall, N.J., 1988, hereby incorporated by reference). This method could be used in the context of the present innovations, and is only intended to be one example of possible implementations.

Alternatively GRND-05 Tracking Moving Objects in Video Using Wavelet Domain Information, and the teaching from GRND-06P, GRND-07P, including Mean-shift analysis (by Cetin & Ahiska) could be used.

If an object-tracking application requires even higher accuracy it is possible to revert the coordinates of the object obtained from the enhanced frame back to the original wide-angle view and continue performing the analysis on the high-resolution image.

Detailed Description of Master/Slave Camera Control

The method could be used in a wide-angle camera attached to a slave camera as in GRND-04, which has been incorporated by reference above.

The present innovations can also be used to implement and monitor behavior analysis as described in the cited and incorporated references. Tracking info could be further processed to extract behavior analysis Modifications and Variations As will be recognized by those skilled in the art, the innovative concepts described in the present application can be modified and varied over a tremendous range of applications, and accordingly the scope of patented subject matter is not limited by any of the specific exemplary teachings given.

Though the preferred embodiment describes object tracking, other image processing techniques can benefit from the non-uniform scaling described herein.

The present innovations have been described in the context of specific examples, such as specific camera systems, algorithms, distortions, and other details intended to aid in understanding the inventions. However, these details are only exemplary, and are not intended to indicate limits to the implementation or embodiments of the present innovations.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC Section 112 unless the exact words "means for" are followed by a participle.

According to a disclosed class of innovative embodiments, there is provided: A method and a system of detecting and tracking moving objects accurately on a wide-angle digital video sequence comprising: converting a sequence of high resolution wide-angle video frames into enhanced frames; detecting and tracking plurality of moving objects on the said enhanced frames; transforming the coordinates of the said objects to a different world coordinate system.

According to a disclosed class of innovative embodiments, there is provided: A wide-angle camera capable of detecting and tracking moving objects accurately on a wide-angle digital video sequence comprising an internal processor capable of converting captured wide-angle video frames captured by the camera into enhanced frames for the purpose of detecting and tracking moving objects.

According to a disclosed class of innovative embodiments, there is provided: A method of processing a plurality of frames of wide-angle video, comprising the steps of: scaling at least one of the plurality of frames using a non-uniform scaling; performing an image processing operation on the at least one frame.

What is claimed is:

1. A method for performing image analysis functions in image processing circuitry, comprising:
   (a) capturing a sequence of high-resolution frames through a wide-angle non-perspective optical train;
   (b) reducing the pixel resolution of at least some frames in said sequence to thereby produce reduced resolution frames, using a procedure which reduces a pixel count of selected transitory image portions corresponding to imaged objects, wherein the selected image portions corresponding to small-appearing objects are reduced in resolution less than the selected image portions corresponding to large-appearing objects, wherein the reduction of resolution results in a closer similarity in the size of the selected image portions corresponding to transitory objects and maintains at least a minimum number of pixels for the selected image portions; and
   (c) performing an image analysis that requires the minimum number of pixels on said reduced resolution frames, and outputting the result of said image analysis.

2. The method of claim 1, wherein the reduced resolution image undergoes at least one of: motion detection analysis; object detection analysis; object recognition analysis; object tracking analysis; and object behavior analysis.

3. The method of claim 1, wherein said image analysis occurs on an external device.

4. The method of claim 1, wherein the reduced resolution frames exhibit a different aspect ratio in at least some parts of the frames compared to the original high-resolution frames.

5. A method of detecting and tracking moving objects in a captured wide-angle digital video sequence, comprising:
   capturing a sequence of wide-angle high-resolution images using a wide-angle digital video camera;

selecting image parts in at least some of said high-resolution images, said selected parts corresponding to one or more transitory objects of interest in said high-resolution images;

converting at least some of said high-resolution images into reduced-size lower-resolution images, selectively scaling down resolution of said selected image parts differently, based on the relative apparent size of the transitory objects of interest, using a spatially non-linear transform, to maintain a minimum pixel count in said objects of interest; and performing an image analysis function on said lower-resolution images, wherein said pixel count is defined by said image analysis function.

6. The method of claim 5, wherein said pixel count comprises a threshold for operation of said image analysis function.

7. The method of claim 5, wherein the reduced-size lower resolution image is digitally transmitted to an external device which receives and performs image analysis on said reduced-size lower resolution image.

8. The method of claim 5, wherein maintaining said pixel count produces visually distorted objects with less proportionally dissimilar pixel counts than corresponding objects in said high-resolution images, altering the aspect ratio in parts of the lower-resolution images containing the objects compared to corresponding parts in the high-resolution images.

9. The method of claim 5, wherein the lower-resolution images undergo at least one of:
motion detection analysis;
object detection analysis;
object recognition analysis;
object tracking analysis; and
object behavior analysis.

10. A method for performing image analysis of a video image sequence, comprising:
capturing a sequence of wide-angle non-perspective frames with optically distorted images;
performing nonlinear reduction of a pixel count of smaller transitory image portions disproportionately to a pixel count of larger transitory image portions, within the same distorted image, in at least some captured frames to produce reduced resolution frames, while selectively preserving at least a first pixel count for the transitory image portions, the first pixel count being defined for optimization of an image analysis function;
performing the image analysis function on said reduced resolution frames; and
outputting a result of said image analysis.

11. The method of claim 10, wherein the reduced resolution frames undergo at least one of: motion detection analysis; object detection analysis; object recognition analysis; object tracking analysis; and object behavior analysis.

12. The method of claim 10, wherein the first pixel count comprises a threshold for performance of said image analysis.

13. The method of claim 11, wherein the selected portions of the reduced resolution frames exhibit a different aspect ratio compared to corresponding portions of the captured frames.

* * * * *